(12) United States Patent
Pudleiner et al.

(10) Patent No.: US 10,131,178 B2
(45) Date of Patent: Nov. 20, 2018

(54) LAYERED STRUCTURE AND FILMS FOR ID DOCUMENTS HAVING IMPROVED PROPERTIES FOR LASER ENGRAVING

(75) Inventors: Heinz Pudleiner, Krefeld (DE); Mehmet-Cengiz Yesildag, Leverkusen (DE); Georgios Tziovaras, Wuppertal (DE); Joerg Nickel, Dormagen (DE); Klaus Meyer, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 1678 days.

(21) Appl. No.: 13/147,452

(22) PCT Filed: Jan. 23, 2010

(86) PCT No.: PCT/EP2010/000409
§ 371 (c)(1),
(2), (4) Date: Sep. 20, 2011

(87) PCT Pub. No.: WO2010/089035
PCT Pub. Date: Aug. 12, 2010

(65) Prior Publication Data
US 2012/0001413 A1    Jan. 5, 2012

(30) Foreign Application Priority Data

Feb. 4, 2009 (EP) .................................... 09001477
Sep. 19, 2009 (EP) .................................... 09011959

(51) Int. Cl.
*B42D 15/00* (2006.01)
*B42D 15/10* (2006.01)
(Continued)

(52) U.S. Cl.
CPC .............. *B42D 25/41* (2014.10); *B32B 27/00* (2013.01); *B32B 27/08* (2013.01); *B32B 27/20* (2013.01);
(Continued)

(58) Field of Classification Search
CPC ........... B42D 15/00; B42D 15/10; G09C 3/00
(Continued)

(56) References Cited

U.S. PATENT DOCUMENTS 3,692,744 A    9/1972    Rich et al.
4,176,224 A    11/1979   Bier et al.
(Continued)

FOREIGN PATENT DOCUMENTS

CA    1284125 C    5/1991
DE    1900270 A1   11/1969
(Continued)

OTHER PUBLICATIONS

Freitag, D., et al., *Polycarbonates* (1988), vol. 11, 2nd Ed., Encyclopedia of Polymer Science and Engineering, pp. 648-718.
(Continued)

*Primary Examiner* — Justin V Lewis
(74) *Attorney, Agent, or Firm* — Drinker Biddle & Reath LLP (57) ABSTRACT

The present invention relates to a layer structure having improved properties for laser engraving, to particular embodiments of said layer structures in the form of co-extrusion films, and to security documents, preferably identification documents having said layer structures.

16 Claims, 1 Drawing Sheet

(51) Int. Cl.

| | | |
|---|---|---|
| *G09C 3/00* | (2006.01) | |
| *B42D 25/41* | (2014.01) | |
| *B32B 27/00* | (2006.01) | |
| *B32B 27/08* | (2006.01) | |
| *B32B 27/20* | (2006.01) | |
| *B41M 5/26* | (2006.01) | |
| *B42D 25/43* | (2014.01) | |
| *B42D 25/29* | (2014.01) | |
| *B42D 25/45* | (2014.01) | |
| *B41M 3/14* | (2006.01) | |

(52) U.S. Cl.
CPC ............. *B41M 5/267* (2013.01); *B42D 25/29* (2014.10); *B42D 25/43* (2014.10); *B42D 25/45* (2014.10); *B32B 2250/24* (2013.01); *B32B 2307/402* (2013.01); *B32B 2307/4026* (2013.01); *B32B 2425/00* (2013.01); *B32B 2519/00* (2013.01); *B41M 3/14* (2013.01); *B42D 2033/20* (2013.01); *B42D 2033/30* (2013.01); *Y10T 428/2495* (2015.01); *Y10T 428/269* (2015.01)

(58) Field of Classification Search
USPC ........ 283/67, 70, 72, 74, 75, 81, 86, 94, 95, 283/96, 98; 428/32
See application file for complete search history.

(56) References Cited

U.S. PATENT DOCUMENTS

| | | | |
|---|---|---|---|
| 4,803,114 A | 2/1989 | Schledorn | |
| 5,126,428 A | 6/1992 | Freitag et al. | |
| 5,944,356 A | 8/1999 | Bergmann et al. | |
| 6,562,454 B2 * | 5/2003 | Takahashi et al. | 428/354 |
| 6,562,464 B1 * | 5/2003 | Schwalm et al. | 428/411.1 |
| 6,824,849 B2 * | 11/2004 | Herzog et al. | 428/40.1 |
| 8,478,080 B2 * | 7/2013 | Springmann et al. | 283/73 |
| 2005/0001419 A1 * | 1/2005 | Levy et al. | 281/2 |
| 2007/0295689 A1 | 12/2007 | Clauss et al. | |
| 2008/0238086 A1 * | 10/2008 | Geuens et al. | 283/110 |
| 2008/0290649 A1 * | 11/2008 | Klein et al. | 283/86 |
| 2008/0296887 A1 * | 12/2008 | Baggenstos | 283/109 |
| 2011/0076452 A1 | 3/2011 | Sakagami et al. | |

FOREIGN PATENT DOCUMENTS

| | | |
|---|---|---|
| DE | 2407674 A1 | 10/1974 |
| DE | 1966931 A1 | 5/1975 |
| DE | 2407776 A1 | 9/1975 |
| DE | 2715932 A1 | 10/1978 |
| DE | 3832396 A1 | 2/1990 |
| EP | 0190997 A2 | 8/1986 |
| EP | 0232502 A2 | 8/1987 |
| EP | 0359953 A1 | 3/1990 |
| EP | 1056041 A2 | 11/2000 |
| EP | 1852269 A1 | 11/2007 |
| EP | 1852270 A1 | 11/2007 |
| FR | 1561518 A | 3/1969 |
| GB | 1229482 A | 4/1971 |
| GB | 1464449 A | 2/1977 |
| JP | 2002-012733 | 1/2002 |
| JP | 2004268554 A | 9/2004 |
| JP | 2007-210166 | 3/2007 |
| JP | 2007-118416 | 5/2007 |
| JP | 2007-210166 | 8/2007 |
| NL | 7602830 A | 9/1979 |
| WO | WO-2004/50766 A1 | 6/2004 |
| WO | WO-2004/50767 A1 | 6/2004 |
| WO | WO-2006/042714 A1 | 4/2006 |
| WO | WO-2009/145059 A1 | 12/2009 |

OTHER PUBLICATIONS

Morgan, P.W., *Condensation Polymers: By Interfacial and Solution Methods* (1965), Interscience Publishers, Library of Congress Catalog Card No. 64-24376, pp. 325-393.

Schnell, H., *Chemistry and Physics of Polycarbonates* (1964), Interscience Publishers, pp. 77-98.

* cited by examiner

LAYERED STRUCTURE AND FILMS FOR ID DOCUMENTS HAVING IMPROVED PROPERTIES FOR LASER ENGRAVING

CROSS-REFERENCE TO RELATED APPLICATIONS

This application is a national stage application (under 35 U.S.C. § 371) of PCT/EP2010/000409, filed Jan. 23, 2010, which claims benefit of European application 09011959.5, filed Sep. 19, 2009 and European application 09001477.0, filed Feb. 4, 2009, all of which are incorporated herein by reference in their entirety for all their useful purposes.

BACKGROUND

The present invention relates to a layered structure having improved laser engravability, to particular embodiments of such layered structures in the form of coextruded films, and to security documents, preferably identification documents, comprising such layered structures.

Inscribing plastics films by means of laser engraving is an important step in the production of film composites. Such film composites play a large part, for example, for security documents, in particular identification documents such as passports, passes, ID cards or credit cards. The black-and-white personalisation of cards by means of laser engraving, that is to say the application of lettering or images such as black-and-white photographs, is generally known. Personalisation by means of laser engraving is generally distinguished in particular by its high security against forgery. The (text) image is formed on the inside of the card, so that it is not possible to remove the (text) image and produce a new (text) image. Separation of the cards into their individual layers in order to reach the laser layer is not possible, for example, in the case of cards made completely of polycarbonate.

In the personalisation of security documents, in particular identification documents, there is an increasing need for improved sharpness and resolution.

EP 190 997 A2 describes various inorganic or organic pigments for laser engraving, which are used in amounts of from 0.001 to 10 wt. % (from 10 to 100,000 wt.ppm), preferably from 0.01 to 3 wt. % (from 100 to 30,000 wt.ppm). In the embodiments described by way of example, the pigments are used in an amount of 1.8 wt. % (18,000 wt.ppm). When such high concentrations of laser-sensitive pigments are used for laser engraving, there is the problem that agglomerates in the laser-inscribable layer lead to so-called "burners", that is to say thick black points, during the laser inscription and thus impair considerably the quality of the lettering or image to be produced. In addition, in particular when black pigments are used, such high concentrations lead to marked greying of the base material, as a result of which the contrast with respect to the lettering or image to be produced, and hence also its sharpness and resolution, is diminished.

EP 232 502 A2 describes the use of carbon black as a black pigment for the laser engraving of PVC-based identification cards. The carbon black is used in amounts of from 0.1 to 20 g per 100 kg of PVC powder (from 1 to 200 wt.ppm), preferably in an amount of 0.6 g per 100 kg of PVC powder (6 wt.ppm). The above-mentioned problem exists here too with high carbon black concentrations. However, with low carbon black concentrations, which are preferred, the sharpness and resolution of the lettering or image to be produced are not optimal and could therefore be improved.

In EP 1 056 041 A2, it is described that the sharpness and resolution of the laser inscription in a multilayer identification card can be improved if the layer containing the laser-sensitive additive is made as thin as possible, that is to say thinner than 50 μm. EP 1 056 041 A2 gives no indication of a possible influence of the concentration of the additive used. In the single example, an amount of 200 ppm of carbon black, based on a lacquer composition, is used, which after drying results in a markedly higher concentration in the dried layer. The embodiment described in EP 1 056 041 A2 again has the disadvantage of agglomerate formation and increased greying of the base material, as a result of which the sharpness and resolution of the lettering or image to be produced are not optimal and could therefore be improved.

JP 2007-210166 describes a three-layer, laser-inscribable coextruded film of polycarbonate, wherein all three layers must necessarily contain a laser-sensitive additive. However, the presence of laser-sensitive additives in all three layers causes the contrast to be impaired and accordingly, as a result, the sharpness and resolution of the lettering or image to be produced are likewise not optimal and could be improved.

Accordingly, there was a continued need for an improvement in the sharpness and resolution of lettering or images which are to be incorporated by means of laser engraving in order to personalise security documents, in particular identification documents, without having to accept the disadvantage of a poor colour effect because of increased greying of the base material.

BRIEF DESCRIPTION OF PREFERRED EMBODIMENTS

The object underlying the invention was, therefore, to provide a layered structure which is suitable for the personalised laser inscription of security documents, in particular identification documents, by means of laser engraving and in which lettering or images can be incorporated by means of laser engraving with improved sharpness and resolution as compared with known systems, without having to accept the disadvantage of a poor colour effect because of increased greying of the base material.

Surprisingly, it has been found that, in the laser engraving of a layered structure comprising at least one layer having a layer thickness of from 5 to 30 μm containing at least one thermoplastic plastic and at least one laser-sensitive additive in an amount of from 40 to 180 ppm, such improved sharpness and resolution can be achieved without a poorer colour effect being formed because of increased greying of the base material. A suitable carrier for such a layer is a further layer containing at least one thermoplastic plastic.

The present invention accordingly provides a layered structure comprising
  at least one layer containing at least one thermoplastic plastic and
  at least one layer containing at least one thermoplastic plastic and at least one black pigment as laser-sensitive additive,
characterised in that the layer containing at least one thermoplastic plastic is free of laser-sensitive additives, and the layer containing at least one thermoplastic plastic and at least one black pigment as laser-sensitive additive has a layer thickness of from 5 to 30 μm, and the black pigment as laser-sensitive additive is present in that layer in an amount of from 40 to 180 ppm.

DETAILED DESCRIPTION OF PREFERRED EMBODIMENTS

Within the scope of the invention, ppm is to be understood as meaning wt.ppm, unless indicated otherwise.

The choice according to the invention of layer thickness and amount of laser-sensitive additive results on the one hand in sufficient transparency and on the other hand, however, in sufficient absorption centres for the laser energy and accordingly provides the possibility of inscription by means of laser engraving with improved quality, that is to say sharpness and resolution.

The inscription of plastics films by means of laser engraving is referred to among experts and also hereinbelow as laser inscription for short. Accordingly, the expression "laser-inscribed" hereinbelow is to be understood as meaning inscribed by means of laser engraving. The process of laser engraving is known to the person skilled in the art and is not to be confused with printing by means of laser printing.

Suitable laser-sensitive additives are, for example, so-called laser marking additives, that is to say additives comprising an absorber in the wavelength range of the laser to be used, preferably in the wavelength range of ND:YAG lasers (neodymium-doped yttrium-aluminium-garnet lasers). Such laser marking additives and their use in moulding compositions are described, for example, in WO-A 2004/50766 and WO-A 2004/50767 and are sold commercially by DSM under the trade name Micabs®. Further absorbers suitable as laser-sensitive additives are carbon black, and phosphorus-containing tin/copper mixed oxides as described, for example, in WO-A 2006/042714.

Preference is given to laser-sensitive additives for inscription by laser engraving of dark on a light background. Particularly preferred laser-sensitive additives within the scope of the invention are black pigments. A most particularly preferred laser-sensitive additive is carbon black.

It is preferable for the particle size of the laser-sensitive additive to be in the range from 100 nm to 10 μm, and particularly advantageous for it to be in the range from 50 nm to 2 μm.

The thermoplastic plastic both of the layer(s) containing at least one thermoplastic plastic and of the layer(s) containing at least one thermoplastic plastic and at least one laser-sensitive additive can preferably be at least one thermoplastic plastic selected from polymers of ethylenically unsaturated monomers and/or polycondensation products of bifunctional reactive compounds and/or polyaddition products of bifunctional reactive compounds. For some applications it can be advantageous, and accordingly preferred, to use a transparent thermoplastic plastic. The thermoplastic plastic of the layer(s) containing at least one thermoplastic plastic and of the layer(s) containing at least one thermoplastic plastic and at least one laser-sensitive additive can be the same or different.

Particularly suitable thermoplastic plastics are polycarbonates or copolycarbonates based on diphenols, poly- or copoly-acrylates and poly- or copoly-methacrylates, such as, for example and preferably, polymethyl methacrylate (PMMA), polymers or copolymers with styrene, such as, for example and preferably, polystyrene (PS) or polystyrene acrylonitrile (SAN), thermoplastic polyurethanes, as well as polyolefins, such as, for example and preferably, polypropylene types or polyolefins based on cyclic olefins (e.g. TOPAS®, Hoechst), poly- or copoly-condensation products of terephthalic acid, such as, for example and preferably, poly- or copoly-ethylene terephthalate (PET or CoPET), glycol-modified PET (PETG), glycol-modified poly- or copoly-cyclohexanedimethylene terephthalate (PCTG) or poly- or copoly-butylene terephthalate (PBT or CoPBT), poly- or copoly-condensation products of naphthalenedicarboxylic acid, such as, for example and preferably, polyethylene glycol naphthalate (PEN), poly- or copoly-condensation product(s) of at least one cycloalkyldicarboxylic acid, such as, for example and preferably, polycyclohexanedimethanolcyclohexanedicarboxylic acid (PCCD), polysulfones (PSU), or mixtures of the above-mentioned thermoplastic plastics.

Preferred thermoplastic plastics are polycarbonates or copolycarbonates or blends containing at least one polycarbonate or copolycarbonate. Particular preference is given to blends containing at least one polycarbonate or copolycarbonate and at least one poly- or copoly-condensation product of terephthalic acid, naphthalenedicarboxylic acid or of a cycloalkyldicarboxylic acid, preferably of cyclohexanedicarboxylic acid. Most particular preference is given to polycarbonates or copolycarbonates, in particular having mean molecular weights $M_w$ of from 500 to 100,000, preferably from 10,000 to 80,000, particularly preferably from 15,000 to 40,000, or blends thereof with at least one poly- or copoly-condensation product of terephthalic acid having mean molecular weights $M_w$, of from 10,000 to 200,000, preferably from 26,000 to 120,000.

In preferred embodiments of the invention, polyalkylene terephthalates are suitable as poly- or copoly-condensation products of terephthalic acid. Suitable polyalkylene terephthalates are, for example, reaction products of aromatic dicarboxylic acids or reactive derivatives thereof (e.g. dimethyl esters or anhydrides) and aliphatic, cycloaliphatic or araliphatic diols and mixtures of these reaction products.

Preferred polyalkylene terephthalates can be prepared from terephthalic acid (or reactive derivatives thereof) and aliphatic or cycloaliphatic diols having from 2 to 10 carbon atoms by known methods (Kunststoff-Handbuch, Vol. VIII, p. 695 ff, Karl-Hanser-Verlag, Munich 1973).

Preferred polyalkylene terephthalates contain at least 80 mol %, preferably 90 mol %, terephthalic acid radicals, based on the dicarboxylic acid component, and at least 80 mol %, preferably at least 90 mol %, ethylene glycol and/or 1,4-butanediol and/or 1,4-cyclohexanedimethanol radicals, based on the diol component.

The preferred polyalkylene terephthalates can contain, in addition to terephthalic acid radicals, up to 20 mol % of radicals of other aromatic dicarboxylic acids having from 8 to 14 carbon atoms or aliphatic dicarboxylic acids having from 4 to 12 carbon atoms, for example radicals of phthalic acid, isophthalic acid, naphthalene-2,6-dicarboxylic acid, 4,4'-diphenyldicarboxylic acid, succinic, adipic, sebacic acid, azelaic acid, cyclohexanediacetic acid.

In addition to ethylene and 1,4-butanediol glycol radicals, the preferred polyalkylene terephthalates can contain up to 80 mol % of other aliphatic diols having from 3 to 12 carbon atoms or cycloaliphatic diols having from 6 to 21 carbon atoms, for example radicals of 1,3-propanediol, 2-ethyl-1, 3-propanediol, neopentyl glycol, 1,5-pentanediol, 1,6-hexanediol, cyclohexane-1,4-dimethanol, 3-methyl-2,4-pentanediol, 2-methyl-2,4-pentanediol, 2,2,4-trimethyl-1,3-pentanediol and 2-ethyl-1,6-hexanediol, 2,2-diethyl-1,3-propanediol, 2,5-hexanediol, 1,4-di-([beta]-hydroxyethoxy)-benzene, 2,2-bis-(4-hydroxycyclohexyl)- propane, 2,4-dihydroxy-1,1,3,3-tetramethyl-cyclobutane, 2,2-bis-(3-[beta]-hydroxyethoxyphenyl)-propane and 2,2-bis-(4-hydroxypropoxyphenyl)-propane (see DE-OS 24 07 674, 24 07 776, 27 15 932).

The polyalkylene terephthalates can be branched by incorporating relatively small amounts of tri- or tetra-hydric alcohols or tri- or tetra-basic carboxylic acids, as are described, for example, in DE-OS19 00 270 and U.S. Pat. No. 3,692,744. Examples of preferred branching agents are trimesic acid, trimellitic acid, trimethylol-ethane and—propane and pentaerythritol.

Preferably, not more than 1 mol % of the branching agent, based on the acid component, is used.

Particular preference is given to polyalkylene terephthalates which have been prepared solely from terephthalic acid and reactive derivatives thereof (e.g. dialkyl esters thereof) and ethylene glycol and/or 1,4-butanediol and/or 1,4-cyclohexanedimethanol radicals, and mixtures of these polyalkylene terephthalates.

Preferred polyalkylene terephthalates are also copolyesters, which are prepared from at least two of the above-mentioned acid components and/or from at least two of the above-mentioned alcohol components; particularly preferred copolyesters are poly(ethylene glycol/1,4-butanediol) terephthalates.

The polyalkylene terephthalates preferably used as a component preferably have an intrinsic viscosity of approximately from 0.4 to 1.5 dl/g, preferably from 0.5 to 1.3 dl/g, in each case measured in phenol/o-dichlorobenzene (1:1 parts by weight) at 25° C.

In particularly preferred embodiments of the invention, the blend of at least one polycarbonate or copolycarbonate with at least one poly- or copoly-condensation product of terephthalic acid is a blend of at least one polycarbonate or copolycarbonate with poly- or copoly-butylene terephthalate or glycol-modified poly- or copoly-cyclohexanedimethylene terephthalate. Such a blend of polycarbonate or copolycarbonate with poly- or copoly-butylene terephthalate or glycol-modified poly- or copoly-cyclohexanedimethylene terephthalate can preferably be a blend containing from 1 to 90 wt. % polycarbonate or copolycarbonate and from 99 to 10 wt. % poly- or copoly-butylene terephthalate or glycol-modified poly- or copoly-cyclohexanedimethylene terephthalate, preferably containing from 1 to 90 wt. % polycarbonate and from 99 to 10 wt. % polybutylene terephthalate or glycol-modified polycyclohexanedimethylene terephthalate, the sum of the amounts being 100 wt. %. Such a blend of polycarbonate or copolycarbonate with poly- or copoly-butylene terephthalate or glycol-modified poly- or copoly-cyclohexanedimethylene terephthalate can particularly preferably be a blend containing from 20 to 85 wt. % polycarbonate or copolycarbonate and from 80 to 15 wt. % poly- or copoly-butylene terephthalate or glycol-modified poly- or copoly-cyclohexanedimethylene terephthalate, preferably containing from 20 to 85 wt. % polycarbonate and from 80 to 15 wt. % polybutylene terephthalate or glycol-modified polycyclohexanedimethylene terephthalate, the sum of the amounts being 100 wt. %. Such a blend of polycarbonate or copolycarbonate with poly- or copoly-butylene terephthalate or glycol-modified poly- or copoly-cyclohexanedimethylene terephthalate can most particularly preferably be a blend containing from 35 to 80 wt. % polycarbonate or copolycarbonate and from 65 to 20 wt. % poly- or copoly-butylene terephthalate or glycol-modified poly- or copoly-cyclohexanedimethylene terephthalate, preferably containing from 35 to 80 wt. % polycarbonate and from 65 to 20 wt. % polybutylene terephthalate or glycol-modified polycyclohexanedimethylene terephthalate, the sum of the amounts being 100 wt. %. In most particularly preferred embodiments, the blends can be blends of polycarbonate and glycol-modified polycyclohexanedimethylene terephthalate in the above-mentioned compositions.

In preferred embodiments, suitable polycarbonates or copolycarbonates are especially aromatic polycarbonates or copolycarbonates.

The polycarbonates or copolycarbonates can be linear or branched in known manner.

The preparation of these polycarbonates can take place in known manner from diphenols, carbonic acid derivatives, optionally chain terminators and optionally branching agents. Details regarding the preparation of polycarbonates have been recorded in many patent specifications for about 40 years. By way of example, reference is made here only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second Edition, 1988, pages 648-718 and finally to Dres. U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

Suitable diphenols can be, for example, dihydroxyaryl compounds of the general formula (I)

HO—Z—OH        (I)

wherein Z is an aromatic radical having from 6 to 34 carbon atoms which can contain one or more optionally substituted aromatic nuclei and aliphatic or cycloaliphatic radicals or alkylaryls or heteroatoms as bridge members.

Examples of suitable dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl)ethers, bis-(hydroxyphenyl)ketones, bis-(hydroxyphenyl)sulfides, bis-(hydroxyphenyl)-sulfones, bis-(hydroxyphenyl)sulfoxides, 1,1'-bis-(hydroxyphenyl)-diisopropylbenzenes, and the compounds thereof alkylated and halogenated on the ring.

These and further suitable dihydroxyaryl compounds are described, for example, in DE-A 3 832 396, FR-A 1 561 518, in H. Schnell, Chemistry and Physics of Polycarbonates, Interscience Publishers, New York 1964, p. 28 ff; p. 102 ff and in D. G. Legrand, J. T. Bendler, Handbook of Polycarbonate Science and Technology, Marcel Dekker New York 2000, p. 72 ff.

Preferred dihydroxyaryl compounds are, for example, resorcinol, 4,4'-dihydroxydiphenyl, bis-(4-hydroxyphenyl)-methane, bis-(3,5-dimethyl-4-hydroxyphenyl)-methane, bis-(4-hydroxyphenyl)-diphenyl-methane, 1,1-bis-(4-hydroxyphenyl)-1-phenyl-ethane, 1,1-bis-(4-hydroxyphenyl)-1-(1-naphthyl)-ethane, 1,1-bis-(4-hydroxyphenyl)-1-(2-naphthyl)-ethane, 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-1-phenyl-propane, 2,2-bis-(4-hydroxyphenyl)-hexafluoro-propane, 2,4-bis-(4-hydroxyphenyl)-2-methyl-butane, 2,4-bis-(3,5-dimethyl-4-hydroxyphenyl)-2-methylbutane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-4-methyl-cyclohexane, 1,3-bis-[2-(4-hydroxyphenyl)-2-propyl]-benzene, 1,1'-bis-(4-hydroxyphenyl)-3-diisopropylbenzene, 1,1'-bis-(4-hydroxyphenyl)-4-diisopropyl-benzene, 1,3-bis-[2-(3,5-dimethyl-4-hydroxyphenyl)-2-propyl]-benzene, bis-(4-hydroxyphenyl)ether, bis-(4-hydroxyphenyl)sulfide, bis-(4-hydroxyphenyl)-sulfone, bis-(3,5-dimethyl-4-hydroxyphenyl)-sulfone and 2,2',3,3'-tetrahydro-3,3,3',3'-tetramethyl-1,1'-spirobi-[1H-indene]-5,5'-diol or dihydroxydiphenylcycloalkanes of formula (Ia)

(Ia)

wherein $R^1$ and $R^2$ independently of one another represent hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl, m represents an integer from 4 to 7, preferably 4 or 5,

$R^3$ and $R^4$, which can be chosen individually for each X, independently of one another represent hydrogen or $C_1$-$C_6$-alkyl and X represents carbon, with the proviso that, on at least one atom X, $R^3$ and $R^4$ simultaneously represent alkyl. In formula (Ia), $R^3$ and $R^4$ are preferably simultaneously alkyl on one or two atom(s) X, in particular on only one atom X.

The preferred alkyl radical for the radicals $R^3$ and $R^4$ in formula (Ia) is methyl. The X atoms in the alpha-position relative to the diphenyl-substituted carbon atom (C-1) are preferably not dialkyl-substituted; alkyl disubstitution in the beta-position relative to C-1 is preferred, however.

Particularly preferred dihydroxydiphenylcycloalkanes of formula (Ia) are those having 5 and 6 ring carbon atoms X in the cycloaliphatic radical (m=4 or 5 in formula (Ia)), for example the diphenols of formulae (Ia-1) to (Ia-3)

(Ia-1)

(Ia-2)

(Ia-3)

A most particularly preferred dihydroxydiphenylcycloalkane of formula (Ia) is 1,1-bis-(4-hydroxyphenyl)-3,3,5-trimethyl-cyclohexane (formula (Ia-1) wherein $R^1$ and $R^2$ are H).

Such polycarbonates can be prepared from dihydroxydiphenylcycloalkanes of formula (Ia) according to EP-A 359 953.

Particularly preferred dihydroxyaryl compounds are resorcinol, 4,4'-dihydroxydiphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Most particularly preferred dihydroxyaryl compounds are 4,4'-dihydroxydiphenyl and 2,2-bis-(4-hydroxyphenyl)-propane.

It is possible to use both one dihydroxyaryl compound, with the formation of homopolycarbonates, and various dihydroxyaryl compounds, with the formation of copolycarbonates. It is possible to use both one dihydroxyaryl compound of formula (I) or (Ia), with the formation of homopolycarbonates, and a plurality of dihydroxyaryl compounds of formula (I) and/or (Ia), with the formation of copolycarbonates. The various dihydroxyaryl compounds can be linked together both randomly and block-wise. In the case of copolycarbonates of dihydroxyaryl compounds of formula (I) and (Ia), the molar ratio of dihydroxyaryl compounds of formula (Ia) to the other dihydroxyaryl compounds of formula (I) which are optionally to be used is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I), and in particular between 99 mol % of (Ia) to 1 mol % of (I) and 30 mol % of (Ia) to 70 mol % of (I).

A most particularly preferred copolycarbonate can be prepared using 1,1-bis-(4-hydroxyphenyl)-3,3,5-trimethyl-cyclohexane and 2,2-bis-(4-hydroxyphenyl)-propane dihydroxyaryl compounds of formulae (Ia) and (I).

Suitable carbonic acid derivatives can be, for example, diaryl carbonates of the general formula (II)

(II)

wherein

R, R' and R", which are the same or different, independently of one another represent hydrogen, linear or branched $C_1$-$C_{34}$-alkyl, $C_7$-$C_{34}$-alkylaryl or $C_6$-$C_{34}$-aryl, R can further also represent —COO—R''', wherein R''' represents hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl-phenyl carbonate and di-(methylphenyl)carbonate, 4-ethylphenyl-phenyl carbonate, di-(4-ethylphenyl)carbonate, 4-n-propylphenyl-phenyl carbonate, di-(4-n-propylphenyl)carbonate, 4-isopropylphenyl-phenyl carbonate, di-(4-isopropylphenyl)carbonate, 4-n-butylphenyl-phenyl carbonate, di-(4-n-butylphenyl)carbonate, 4-isobutylphenyl-phenyl carbonate, di-(4-iso-butylphenyl) carbonate, 4-tert-butylphenyl-phenyl carbonate, di-(4-tert-butylphenyl)carbonate, 4-n-pentylphenyl-phenyl carbonate, di-(4-n-pentylphenyl)carbonate, 4-n-hexylphenyl-phenyl carbonate, di-(4-n-hexylphenyl)carbonate, 4-isooctylphenyl-phenyl carbonate, di-(4-isooctylphenyl)carbonate, 4-n-nonylphenyl-phenyl carbonate, di-(4-n-nonylphenyl)carbonate, 4-cyclohexylphenyl-phenyl carbonate, di-(4-cyclohexylphenyl)carbonate, 4-(1-methyl-1-phenylethyl)-phenyl-phenyl carbonate, di-[4-(1-methyl-1-phenylethyl)-phenyl]carbonate, biphenyl-4-yl-phenyl carbonate, di-(biphenyl-4-yl)carbonate, 4-(1-naphthyl)-phenyl-phenyl carbonate, 4-(2-naphthyl)-phenyl-phenyl carbonate, di-[4-(1-naphthyl)-phenyl]carbonate, di-[4-(2-naphthyl)phenyl] carbonate, 4-phenoxyphenyl-phenyl carbonate, di-(4-phenoxyphenyl)carbonate, 3-pentadecylphenyl-phenyl carbonate, di-(3-pentadecylphenyl)carbonate, 4-tritylphenyl-phenyl carbonate, di-(4-tritylphenyl)carbonate, methylsalicylate-phenyl carbonate, di-(methylsalicylate)carbonate, ethylsalicylate-phenyl carbonate, di-(ethylsalicylate)carbonate, n-propylsalicylate-phenyl carbonate, di-(n-propylsalicylate)carbonate, isopropylsalicylate-phenyl carbonate, di-(isopropylsalicylate)carbonate, n-butylsalicylate-phenyl carbonate, di-(n-butylsalicylate)carbonate, isobutylsalicylate-phenyl carbonate, di-(iso-butylsalicylate)carbonate, tert-butylsalicylate-phenyl carbonate, di-(tert-butylsalicylate)carbonate, di-(phenylsalicylate)carbonate and di-(benzylsalicylate)carbonate.

Particularly preferred diaryl compounds are diphenyl carbonate, 4-tert-butylphenyl-phenyl carbonate, di-(4-tert-butylphenyl)carbonate, biphenyl-4-yl-phenyl carbonate, di-(biphenyl-4-yl)carbonate, 4-(1-methyl-1-phenylethyl)-phenyl-phenyl carbonate, di-[4-(1-methyl-1-phenylethyl)-phenyl]carbonate and di-(methylsalicylate)carbonate.

Diphenyl carbonate is most particularly preferred.

It is possible to use both one diaryl carbonate and various diaryl carbonates.

In order to control or modify the end groups, it is additionally possible to use as chain terminators, for example, one or more monohydroxyaryl compound(s) that have not been employed in the preparation of the diaryl carbonate(s) used. Such compounds can be those of the general formula (III)

(III)

wherein
$R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and
$R^B$, $R^C$, which are the same or different, independently of one another represent hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol, 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)-phenol, 4-phenylphenol, 4-phenoxyphenol, 4-(1-naphthyl)-phenol, 4-(2-naphthyl)-phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

4-tert-Butylphenol, 4-isooctylphenol and 3-pentadecylphenol are preferred.

Suitable branching agents can be compounds having three or more functional groups, preferably those having three or more hydroxyl groups.

Suitable compounds having three or more phenolic hydroxyl groups are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl]-propane, 2,4-bis-(4-hydroxyphenyl-isopropyl)-phenol and tetra-(4-hydroxyphenyl)-methane.

Other suitable compounds having three or more functional groups are, for example, 2,4-dihydroxybenzoic acid, trimesic acid (trichloride), cyanuric acid trichloride and 3,3-bis-(3-methyl-4-hydroxyphenyl)-2-oxo-2,3-dihydroindole.

Preferred branching agents are 3,3-bis-(3-methyl-4-hydroxyphenyl)-2-oxo-2,3-dihydroindole and 1,1,1-tri-(4-hydroxyphenyl)-ethane.

At least one layer containing at least one thermoplastic plastic can additionally comprise at least one filler. The filler is preferably at least one colouring pigment and/or at least one other filler for producing translucency of the filled layers, particularly preferably a white pigment, most particularly preferably titanium dioxide, zirconium dioxide or barium sulfate, in a preferred embodiment titanium dioxide.

The filling of a layer containing at least one thermoplastic plastic with at least one such filler improves the visibility of the incorporated inscription or image(s), as a result of which the perception of the improved sharpness and resolution is also increased further.

The mentioned fillers are preferably added to the thermoplastic plastics in amounts of from 2 to 45 wt. %, particularly preferably from 5 to 30 wt. %, based on the total weight of filler and thermoplastic plastic, before the plastics film is shaped, which can take place, for example, by extrusion or coextrusion.

In addition to a first layer containing at least one thermoplastic plastic and at least one laser-sensitive additive, the layered structure according to the invention comprises at least one further, preferably a second, layer containing at least one thermoplastic plastic and at least one laser-sensitive additive, which has a layer thickness of from 5 to 30 μm and contains the laser-sensitive additive in an amount of from 40 to 180 ppm, the layer containing at least one thermoplastic plastic and optionally at least one filler being arranged between the two layers containing at least one thermoplastic plastic and at least one laser-sensitive additive.

The layer(s) containing at least one thermoplastic plastic and at least one laser-sensitive additive preferably has (have) a layer thickness of from 8 to 25 μm.

The laser-sensitive additive is present in the layer(s) containing at least one thermoplastic plastic and at least one laser-sensitive additive preferably in an amount of from 50 to 160 ppm, particularly preferably in an amount of from 60 to 150 ppm, most particularly preferably in an amount of from 60 to 100 ppm.

The layer containing at least one thermoplastic plastic and optionally at least one filler can preferably have a layer thickness of from 30 µm to 375 µm, particularly preferably from 50 µm to 250 µm and most particularly preferably from 75 µm to 200 µm.

The layered structure according to the invention can be produced, for example and preferably, by means of coextrusion of the layers that are present, lamination of the layers that are present or extrusion lamination, that is to say extrusion coating of the layer(s) containing at least one thermoplastic plastic and at least one laser-sensitive additive onto a prefabricated layer containing at least one thermoplastic plastic and optionally at least one filler. The variants coextrusion and extrusion coating are preferred. Production by means of coextrusion is most particularly preferred.

Such a film produced by means of coextrusion represents a particularly preferred embodiment of the layered structure according to the invention and is likewise provided by the invention.

Accordingly, the present invention provides a coextruded film comprising
at least one layer containing at least one thermoplastic plastic and
at least one layer containing at least one thermoplastic plastic and at least one laser-sensitive additive,
characterised in that the layer containing at least one thermoplastic plastic and at least one laser-sensitive additive has a layer thickness of from 5 to 30 µm and the laser-sensitive additive is present in that layer in an amount of from 40 to 180 ppm.

A preferred embodiment is an at least three-layered, preferably three-layered coextruded film which comprises two layers containing at least one thermoplastic plastic and at least one laser-sensitive additive, which layers have a layer thickness of from 5 to 30 µm and contain the laser-sensitive additive in an amount of from 40 to 180 ppm, and at least one, preferably one layer containing at least one thermoplastic plastic, wherein the layer(s) containing at least one thermoplastic plastic is (are) arranged between the two layers containing at least one thermoplastic plastic and at least one laser-sensitive additive.

In a most particularly preferred embodiment of the coextruded film according to the invention, the laser-sensitive additive is present in an amount of from 40 to 100 ppm in the layer containing at least one thermoplastic plastic and at least one laser-sensitive additive. Such an at least three-layered, preferably three-layered coextruded film has the advantage that, when it is incorporated into a security document, it is not necessary to ensure that the layer that is inscribable by means of laser inscription is oriented outwards relative to the thermoplastic plastics layer optionally filled with at least one filler. The symmetrical structure of the particularly preferred coextruded film according to the invention permits laser inscription irrespective of the direction in which the film was incorporated into the security document.

The layer(s) containing at least one thermoplastic plastic preferably contains or contain at least one of the above-mentioned fillers.

The statements made above in respect of the layered structure according to the invention, including the mentioned layer thicknesses, constituents and preferred ranges, apply analogously to the coextruded film according to the invention.

The layered structure according to the invention and the coextruded film according to the invention can comprise further, preferably transparent layers containing at least one of the above-mentioned thermoplastic plastics.

The layered structure according to the invention, and accordingly also the coextruded film according to the invention, is outstandingly suitable as a component of security documents, preferably identification documents, which are to be inscribed by means of laser engraving.

The layered structure according to the invention is suitable preferably for improving the sharpness and quality of lettering and/or images, preferably personalising lettering and/or images, which are to be incorporated by means of laser engraving into security documents, particularly preferably identification documents. The layered structure according to the invention is most particularly preferably suitable for identification documents in the form of bonded or laminated composites in the form of plastics cards, for example identity cards, passports, driving licences, credit cards, bank cards, cards for controlling access or other identity documents, etc. Preferred identification documents within the scope of the present invention are multilayered sheet-like documents having security features such as chips, photographs, biometric data, etc. These security features can be visible or at least scannable from the outside. Such an identification document preferably has a size between that of a bank card and that of a passport. Such an identification document can also be part of a document having several parts, such as, for example, an identification document of plastics material in a passport which also contains parts made of paper or card.

Accordingly, the invention further provides a security document, preferably an identification document, comprising at least one layered structure according to the invention.

The security document, preferably identification document, according to the invention can comprise further additional layers via which further information, for example, can be incorporated into the security document, preferably identification document.

Such further information can be, for example, personalising portraits or non-personalising general information which, for example, is contained in the same form in any generic security document, preferably identification document.

Such layers can be incorporated into the security document, preferably identification document, from, for example, films previously provided with the information by means of conventional printing processes, preferably ink-jet or laser printing, particularly preferably ink-jet printing.

Films which can be printed by means of ink-jet printing processes are known to the person skilled in the art and can be, for example, films comprising at least one of the above-described thermoplastic plastics optionally containing at least one of the above-described fillers. In particularly preferred embodiments, plastics films coloured white or translucent by means of fillers such as, for example, titanium dioxide, zirconium dioxide, barium sulfate, etc. are used for the purpose of better visibility of the printed information.

For films to be printed by means of laser printing, in particular by means of colour laser printing, there are suitable in particular plastics films of one of the above-mentioned thermoplastic plastics having a specific surface resistance of from $10^7$ to $10^{13}\Omega$, preferably from $10^8$ to $10^{12}\Omega$. The specific surface resistance in $\Omega$ is determined in accordance with DIN IEC 93.

The films can preferably be films in which there has been added to the thermoplastic plastic, in order to achieve the specific surface resistance, for example an additive selected from tertiary or quaternary, preferably quaternary, ammonium or phosphonium salts of a partially fluorinated or perfluorinated organic acid or quaternary ammonium or phosphonium hexafluorophosphates, preferably of a partially fluorinated or perfluorinated alkylsulfonic acid, preferably of a perfluoroalkylsulfonic acid.

Preferred suitable quaternary ammonium or phosphonium salts are:
perfluorooctanesulfonic acid tetrapropylammonium salt,
perfluorobutanesulfonic acid tetrapropylammonium salt,
perfluorooctanesulfonic acid tetrabutylammonium salt,
perfluorobutanesulfonic acid tetrabutylammonium salt,
perfluorooctanesulfonic acid tetrapentylammonium salt,
perfluorobutanesulfonic acid tetrapentylammonium salt,
perfluorooctanesulfonic acid tetrahexylammonium salt,
perfluorobutanesulfonic acid tetrahexylammonium salt,
perfluorobutanesulfonic acid trimethylneopentylammonium salt,
perfluorooctanesulfonic acid trimethylneopentylammonium salt,
perfluorobutanesulfonic acid dimethyldineopentylammonium salt,
perfluorooctanesulfonic acid dimethyldineopentylammonium salt,
N-methyl-tripropylammonium perfluorobutylsulfonate,
N-ethyl-tripropylammonium perfluorobutylsulfonate,
tetrapropylammonium perfluorobutylsulfonate,
diisopropyldimethylammonium perfluorobutylsulfonate,
diisopropyldimethylammonium perfluorooctylsulfonate,
N-methyl-tributylammonium perfluorooctylsulfonate,
cyclohexyldiethylmethylammonium perfluorooctylsulfonate,
cyclohexyltrimethylammonium perfluorooctylsulfonate,
and the corresponding phosphonium salts. The ammonium salts are preferred.

Preferably, it is also possible to use one or more of the above-mentioned quaternary ammonium or phosphonium salts, that is to say also mixtures.

The perfluorooctanesulfonic acid tetrapropylammonium salt, perfluorooctanesulfonic acid tetrabutylammonium salt, perfluorooctanesulfonic acid tetrapentylammonium salt, perfluorooctanesulfonic acid tetrahexylammonium salt and perfluoroctanesulfonic acid dimethyldiisopropylammonium salt, and the corresponding perfluorobutanesulfonic acid salts, are most particularly suitable.

In a most particularly preferred embodiment, perfluorobutanesulfonic acid dimethyldiisopropylammonium salt (diisopropyldimethylammonium perfluorobutane-sulfonate) can be used as additive.

The mentioned salts are known or can be prepared by known methods. The salts of the sulfonic acids can be prepared, for example, by combining equimolar amounts of the free sulfonic acid with the hydroxy form of the corresponding cation in water at room temperature and concentrating the solution. Other preparation processes are described, for example, in DE-A 1 966 931 and NL-A 7 802 830.

The mentioned salts are preferably added to the thermoplastic plastics in amounts of from 0.001 to 2 wt. %, preferably from 0.1 to 1 wt. %, before shaping of the plastics film, which can be carried out, for example, by extrusion or coextrusion.

The security document, preferably identification document, according to the invention can also comprise further additional layers which provide protection against UV radiation, protection against mechanical damage—for example scratch-resistant coatings—etc.

The security document, preferably identification document, according to the invention can be produced, for example, as follows: a stack of films is formed from the various films for constructing the security document and is laminated to give a composite and then cut into the suitable form of the security document, preferably identification document. Further layers can optionally subsequently be applied to the composite laminate, for example by adhesive bonding and/or lamination of further films or by coating by means of lacquer compositions.

The following examples serve to explain the invention by way of example and are not to be interpreted as limiting.

EXAMPLES

Preparation of the Masterbatches (Compositions) for the Production of the Layered Structures According to the Invention Example 1

Compounding of a Masterbatch for the Production of the Layer(s) Containing a Laser-sensitive Additive The preparation of the masterbatch for the production of the layer containing a laser-sensitive additive was carried out by means of a conventional twin-screw compounding extruder (ZSK 32) at conventional polycarbonate processing temperatures of from 250 to 330° C.

A masterbatch having the following composition was compounded and then granulated:
Makrolon® 3108 polycarbonate from Bayer MaterialScience AG in an amount of 99.994 wt. %
Flammruß 101 (carbon black from Degussa) having a mean particle size of 95 nm in an amount of 0.006 wt. % (60 ppm).

Example 2

Compounding of a Masterbatch for the Production of the Layer Containing a Thermoplastic Plastic and a White Pigment as Filler The preparation of the masterbatch for the production of the layer containing a thermoplastic plastic and a white pigment as filler was carried out by means of a conventional twin-screw compounding extruder (ZSK 32) at conventional polycarbonate processing temperatures of from 250 to 330° C.

A masterbatch having the following composition was compounded and then granulated:
Makrolon® 3108 polycarbonate from Bayer MaterialScience AG in an amount of 85 wt. %
titanium dioxide (Kronos® 2230 from Kronos Titan) as the white pigment filler in an amount of 15 wt. %.

Production of the Layered Structures According to the Invention in the Form of Coextruded Films:

Examples 3 to 5

Two-layered Coextruded Films with a Thermoplastic Plastic Layer Containing White Pigment as Filler and a Thermoplastic Plastic Layer Containing Laser-sensitive Additive The following two-layered coextruded films were produced from the masterbatches of Examples 1 and 2. The amount of laser-sensitive additive carbon black was varied by diluting the masterbatch of Example 1 with Makrolon 3108® polycarbonate from Bayer MaterialScience AG. The layer containing the laser-sensitive additive and the thermoplastic plastic was denoted the laser-sensitive layer; the layer containing the thermoplastic plastic and the white pigment as filler was denoted the substrate layer.

100 μm thick, laser-inscribable, two-layered films having the following composition were produced:

|  | Laser-sensitive layer Thickness: 15 μm | Substrate layer Thickness: 85 μm | Carbon black content in the laser-sensitive layer [ppm] |
|---|---|---|---|
| Example 3 (comparison example) | 30 wt. % masterbatch of Example 1 and + 70 wt. % Makrolon ® 3108 | 100 wt. % masterbatch of Example 2 | 18 |
| Example 4 (according to the invention) | 70 wt. % masterbatch of Example 1 and + 30 wt. % Makrolon ® 3108 | 100 wt. % masterbatch of Example 2 | 42 |
| Example 5 (according to the invention) | 100 wt. % masterbatch of Example 1 | 100 wt. % masterbatch of Example 2 | 60 |

Examples 6 and 7

Two-layered Coextruded Films with a Thermoplastic Plastic Layer without Filler and a Thermoplastic Plastic Layer Containing Laser-sensitive Additive The following two-layered coextruded films were produced from the masterbatch of Example 1 and Makrolon® 3108 polycarbonate from Bayer MaterialScience AG. The amount of laser-sensitive additive carbon black was varied by diluting the masterbatch of Example 1 with Makrolon® 3108 polycarbonate from Bayer MaterialScience AG. The layer containing the laser-sensitive additive and the thermoplastic plastic was denoted the laser-sensitive layer; the layer containing the thermoplastic plastic without filler was denoted the substrate layer.

100 μm thick, laser-inscribable, two-layered films having the following composition were produced:

|  | Laser-sensitive layer Thickness: 15 μm | Substrate layer Thickness: 85 μm | Carbon black content in the laser-sensitive layer [ppm] |
|---|---|---|---|
| Example 6 (comparison example) | 30 wt. % masterbatch of Example 1 and + 70 wt. % Makrolon ® 3108 | 100 wt. % Makrolon ® 3108 | 18 |
| Example 7 (according to the invention) | 70 wt. % masterbatch of Example 1 and + 30 wt. % Makrolon ® 3108 | 100 wt. % Makrolon ® 3108 | 42 |

Examples 8 and 9

Two-layered Coextruded Films with a Thermoplastic Plastic Layer without Filler and a Thermoplastic Plastic Layer Containing Laser-sensitive Additive The following two-layered coextruded films were produced from the masterbatch of Example 1 and Makrolon® 3108 polycarbonate from Bayer MaterialScience AG. The amount of laser-sensitive additive carbon black was varied by diluting the masterbatch of Example 1 with Makrolon® 3108 polycarbonate from Bayer MaterialScience AG. The layer containing the laser-sensitive additive and the thermoplastic plastic was denoted the laser-sensitive layer; the layer containing the thermoplastic plastic without filler was denoted the substrate layer.

200 μm thick, laser-inscribable, two-layered films having the following composition were produced:

|  | Laser-sensitive layer Thickness: 15 μm | Substrate layer Thickness: 185 μm | Carbon black content in the laser-sensitive layer [ppm] |
|---|---|---|---|
| Example 8 (comparison example) | 30 wt. % masterbatch of Example 1 and + 70 wt. % Makrolon ® 3108 | 100 wt. % Makrolon ® 3108 | 18 |
| Example 9 (according to the invention) | 70 wt. % masterbatch of Example 1 and + 30 wt. % Makrolon ® 3108 | 100 wt. % Makrolon ® 3108 | 42 |

A chrome roller and a matt steel roller were inserted in the calender, and a 200 μm thick laser-inscribable film with a so-called 1-4 surface was produced.

Examples 10 to 12

Three-layered Coextruded Films with a Thermoplastic Plastic Layer Containing White Pigment as Filler and Two Thermoplastic Plastic Layers Containing Laser-sensitive Additive The following three-layered coextruded films were produced from the masterbatches of Examples 1 and 2. The amount of laser-sensitive additive carbon black was varied by diluting the masterbatch of Example 1 with Makrolon® 3108 polycarbonate from Bayer MaterialScience AG. The layers containing the laser-sensitive additive and the thermoplastic plastic were denoted the laser-sensitive layer; the layer containing the thermoplastic plastic and the white pigment as filler was denoted the substrate layer.

100 μm thick, laser-inscribable, three-layered films having the following composition were produced:

out by means of a conventional twin-screw compounding extruder (ZSK 32) at conventional polycarbonate processing temperatures of from 250 to 330° C.

A masterbatch having the following composition was compounded and then granulated:
- Makrolon® 3108 polycarbonate from Bayer MaterialScience AG in an amount of 99.8 wt. %
- Flammruß 101 (carbon black from Degussa) having a mean particle size of 95 nm in an amount of 0.2 wt. % (2000 ppm).

Examples 14 to 20

Two-layered Coextruded Films with a Thermoplastic Plastic Layer Containing White Pigment as Filler and a Thermoplastic Plastic Layer Containing Laser-sensitive Additive The following two-layered coextruded films were produced from the masterbatches of Examples 13 and 2. The amount of laser-sensitive additive carbon black was varied by diluting the masterbatch of Example 13 with Makrolon®

|  | Laser-sensitive layer 1 Thickness: 15 μm | Substrate layer Thickness: 70 μm | Laser-sensitive layer 2 Thickness: 15 μm | Carbon black content of the laser-sensitive layers ppm |
|---|---|---|---|---|
| Example 10 (comparison example) | 30 wt. % masterbatch of Example 1 and + 70 wt. % Makrolon ® 3108 | 100 wt. % masterbatch of Example 2 | 30 wt. % masterbatch of Example 1 and + 70 wt. % Makrolon ® 3108 | 18 |
| Example 11 (according to the invention) | 70 wt. % masterbatch of Example 1 and + 30 wt. % Makrolon ® 3108 | 100 wt. % masterbatch of Example 2 | 70 wt. % masterbatch of Example 1 and + 30 wt. % Makrolon ® 3108 | 42 |
| Example 12 (according to the invention) | 100 wt. % masterbatch of Example 1 | 100 wt. % masterbatch of Example 2 | 100 wt. % masterbatch of Example 1 | 60 |

Example 13

Compounding of a Highly Concentrated Masterbatch for the Production Of the Layer(s) Containing a Laser-sensitive Additive The preparation of the masterbatch for the production of the layer containing a laser-sensitive additive was carried 3108 polycarbonate from Bayer MaterialScience AG. The layer containing the laser-sensitive additive and the thermoplastic plastic was denoted the laser-sensitive layer; the layer containing the thermoplastic plastic and the white pigment as filler was denoted the substrate layer.

100 μm thick, laser-inscribable, two-layered films having the following composition were produced:

|  | Laser-sensitive layer Thickness: 15 μm | Substrate layer Thickness: 85 μm | Carbon black content of the laser-sensitive layer [ppm] |
|---|---|---|---|
| Example 14 (not according to the invention) | 0.9 wt. % masterbatch of Example 13 and + 99.1 wt. % Makrolon ® 3108 | 100 wt. % masterbatch of Example 2 | 18 |
| Example 15 (according to the invention) | 3 wt. % masterbatch of Example 13 and + 97 wt. % Makrolon ® 3108 | 100 wt. % masterbatch of Example 2 | 60 |
| Example 16 (according to the invention) | 5 wt. % masterbatch of Example 13 and + 95 wt. % Makrolon ® 3108 | 100 wt. % masterbatch of Example 2 | 100 |
| Example 17 (not according to the invention) | 10 wt. % masterbatch of Example 13 and + 90 wt. % Makrolon ® 3108 | 100 wt. % masterbatch of Example 2 | 200 |
| Example 18 (not according to the invention) | 15 wt. % masterbatch of Example 13 and + 85 wt. % Makrolon ® 3108 | 100 wt. % masterbatch of Example 2 | 300 |
| Example 19 (not according to the invention) | 20 wt. % masterbatch of Example 13 and + 80 wt. % Makrolon ® 3108 | 100 wt. % masterbatch of Example 2 | 400 |

|  | Laser-sensitive layer Thickness: 15 μm | Substrate layer Thickness: 85 μm | Carbon black content of the laser-sensitive layer [ppm] |
|---|---|---|---|
| Example 20 (not according to the invention) | 25 wt. % masterbatch of Example 13 and + 75 wt. % Makrolon ® 3108 | 100 wt. % masterbatch of Example 2 | 500 |

Example 21

Production of Laser-inscribable Identification Documents (ID Card)

Films Used for the ID Card Layered Structure According to the Invention:
Film 1-1: White-filled Film
A 100 μm thick polycarbonate film based on Makrolon 3108® polycarbonate from Bayer MaterialScience AG and titanium dioxide (Kronos® 2230 from Kronos Titan) as white pigment filler having a composition of 85 wt. % Makrolon 3108® and 15 wt. % titanium dioxide was produced by means of extrusion at a melt temperature of about 280° C.
Film 1-2: White-filled Film
A film having the same composition as film 1-1 and a thickness of 400 μm was produced.
Film 2: Transparent Film
A 50 μm thick polycarbonate film based on Makrolon 3108® polycarbonate from Bayer MaterialScience AG was produced by means of extrusion at a melt temperature of about 280° C.

From the films described above, the laser-inscribable layered structures described hereinbelow were laminated in the form of ID cards:
Layer (1) film 2; 50 μm
Layer (2) coextruded films according to Examples 3 to 12
Layer (3) film 1-1; 100 μm (optional; dependent on the thickness of the film according to the invention)
Layer (4) film 1-2; 400 μm
Layer (5) film 1-1; 100 μm (optional; dependent on the thickness of the film according to the invention)
Layer (6) coextruded films according to Examples 3 to 12
Layer (7) film 2; 50 μm In the above test structure, layers (3) and (5) were used when coextruded films each having layer thicknesses of 100 μm were used for layers (2) and (6), in order to ensure a comparable total layer thickness of the laminated card (see ISO IEC 7810:2003). A symmetrical layered structure of the card was chosen in order to avoid warping of the card. To this end, a stack was formed from the films in the abovementioned sequence, and lamination was carried out on a laminating press from Bürkle with the following parameters:
preheating of the press to 170-180° C.
pressing for 8 minutes at a pressure of 15 N/cm²
pressing for 2 minutes at a pressure of 200 N/cm²
cooling of the press to 38° C. and opening of the press.

Example 22

Laser Engraving of the Laser-inscribable Identification Documents

Laser engraving was carried out on the ID cards of Example 21 in a laser installation from Foba with the following parameters:
laser medium: Nd:YAG
wavelength: 1064 nm
power: 40 watts
current: 30 A
pulse frequency: 14 KHz.
feed rate: 200 mm/sec.

In the laser engraving, the information was inscribed on only one of the laser-inscribable film layers (layer (2)) of the ID card. The information inscribed into the laser-inscribable layer by means of laser engraving was the complete black-and-white portrait of a woman and a grey step wedge.

Example 23

Determination of the Contrast

Determination of the Greyscale Gradient on a Grey Wedge

Figure 1:
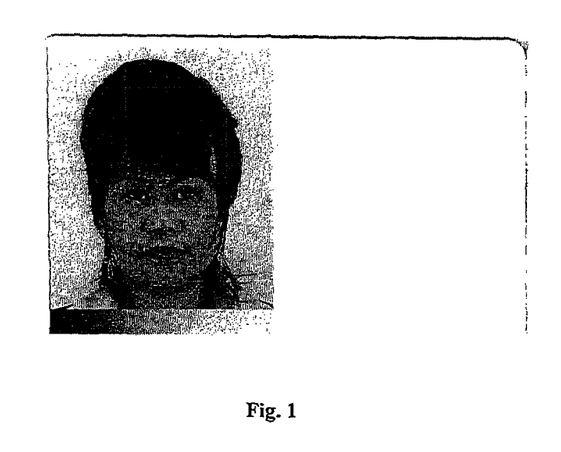
FIG. 1 illustrates a laser-inscribed ID card to be digitised.
Figure 2:
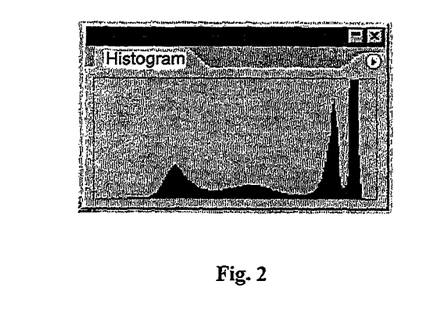
FIG. 2 illustrates an example of an optimally exposed histogram.

In order to determine the greyscale gradient of a grey wedge, the laser-inscribed ID card was digitised by means of a flat-bed scanner with a resolution of 200 dpi. In the histogram (digitised form of the card), which indicates the statistical frequency of the colour values in an image, it was to be ensured that the light areas of the image were not overexposed and the dark areas of the image were not underexposed. Such over- and under-exposure was avoided in that, in the histogram, no curve of a maximum projects below 0 or over 255, but the curves of all the maxima were imaged completely between 0 and 255. An example of such a laser-inscribed ID card to be digitised is shown in FIG. 1. An example of an optimally exposed histogram is shown in FIG. 2.

Figure 3:
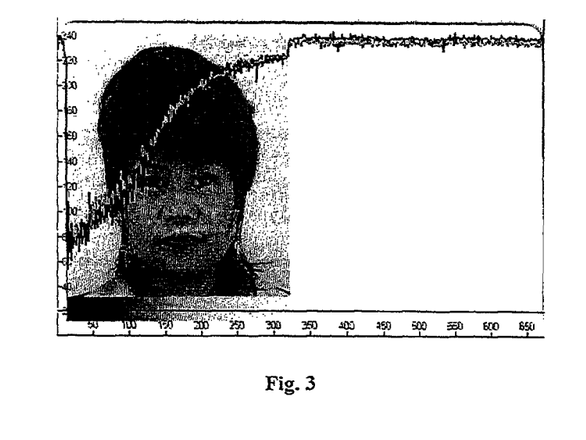
FIG. 3 illustrates intensity curves for the three colour channels red, green and blue for the ID card in FIG. 1.

The resulting 24-bit image (3 base colours (red/green/blue)×8 bit (256 gradations) was stored without loss in tiff format In order to measure the greyscale gradient, a horizontal intensity profile was measured over the grey wedge using the image analysis program AnalySIS. This gave an intensity curve for each colour channel in the RGB (red/green/blue) colour model. By way of example, these intensity curves for the three colour channels red, green and blue for the exemplary ID card in FIG. 1 are shown in FIG. 3. The intensity I was averaged over (R+G+B)/3=I.

Figure 4:
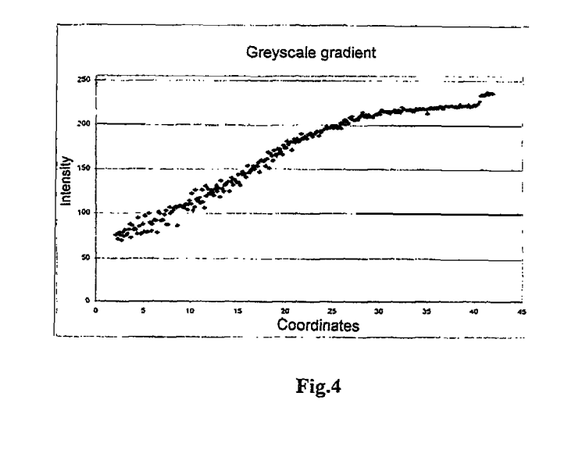
FIG. 4 illustrates a diagram of the greyscale gradient.

In order to show the data as a diagram of the greyscale gradient, only the line points in the region of the grey wedge were evaluated. Image points which are before and after the grey wedge are not taken into consideration in the evaluation. Such a diagram of the greyscale gradient is shown by way of example in FIG. 4.

The data so determined allow samples of a flat-bed scan to be compared or samples of several flat-bed scans to be compared, in the preparation of which in the scanner software the same values in respect of brightness and contrast remain set.

For the data relating to the ID cards according to Example 21, the contrast of the image engraved by means of laser engraving was determined. This contrast was defined by the ratio, that is to say the quotient, of the intensity of the greyscale value at the largest coordinate of the greyscale gradient and the intensity of the greyscale value at the smallest coordinate of the greyscale gradient, the intensity of the greyscale value at the largest coordinate of the greyscale gradient being 255 for all sets of data. This higher this value (quotient), the better the contrast.

The results of the contrast determination are given in Table 1:

| Example | Intensity x-coordinate | Intensity | Quotient (white:grey) | Note |
|---|---|---|---|---|
| Reference | 0 | 236 (grey) | 1.1 | film without laser additive |
|  | 280 | 255 (white) |  |  |
| Example 3 | 7 | 133 | 1.9 | 18 ppm carbon black |
|  | 314 | 255 |  |  |
| Example 4 | 3 | 104 | 2.5 | 42 ppm carbon black |
|  | 304 | 255 |  |  |
| Example 5 | 2 | 80 | 3.2 | 60 ppm carbon black |
|  | 307 | 255 |  |  |
| Example 6 | 6 | 125 | 2.0 | 18 ppm carbon black |
|  | 310 | 255 |  |  |
| Example 7 | 4 | 104 | 2.5 | 42 ppm carbon black |
|  | 307 | 255 |  |  |
| Example 8 | 1 | 132 | 1.9 | 18 ppm carbon black |
|  | 305 | 255 |  |  |
| Example 9 | 6 | 104 | 2.5 | 42 ppm carbon black |
|  | 309 | 255 |  |  |
| Example 10 | 2 | 134 | 1.9 | 18 ppm carbon black |
|  | 305 | 255 |  |  |
| Example 11 | 2 | 101 | 2.5 | 42 ppm carbon black |
|  | 306 | 255 |  |  |
| Example 12 | 4 | 85 | 3.0 | 60 ppm carbon black |
|  | 304 | 255 |  |  |
| Example 14 | 16 | 128 | 1.914 | 18 ppm carbon black |
|  | 425 | 245 |  |  |
| Example 15 | 25 | 83 | 2.95 | 60 ppm carbon black |
|  | 425 | 229 |  |  |
| Example 16 | 27 | 65 | 3.323 | 100 ppm carbon black |
|  | 425 | 216 |  |  |

The mentioned reference film was film 2 described hereinbefore. The reference measurement served to determine the quotient of a film without laser-sensitive additive, in order to rule out the influence of such films without laser-sensitive additive on the measurement.

The results showed that the contrast of the black-and-white portrait incorporated by means of laser engraving into the ID cards containing the layered structures according to the invention was markedly higher than in Comparison Examples 3, 6, 8, 10 and 14 with a lower content of laser-sensitive additive. In Comparison Examples 17 to 20 with a higher content of laser-sensitive additive, a perceptible greying of the background, accompanied by a perceptible darkening of the engraved portrait, could be observed even on visual inspection of the ID cards. The layered structures according to the invention consequently yielded improved sharpness and resolution and an optimum colour effect of the engraved portrait. The chosen range for the content of laser-sensitive additive accordingly shows an optimum for sharpness and resolution of the engraved portrait in combination with an optimum colour effect for the observer. In addition, when assessing the quality and homogeneity of the laser-produced portrait, it became clear that, when the layered structures according to the invention having a carbon black content and a layer thickness each within the range according to the invention were used, agglomerate-free distribution of the carbon black in the laser-inscribable layer (thermoplastic plastic layer containing the laser-sensitive additive) was achieved. No agglomerates were to be found which, after laser inscription, would lead to a thick black point, a so-called burner, in the laser-produced portrait. The layer thickness of the substrate layer or the presence of fillers in the substrate layer had no objective influence on the quality of the portrait engraved by laser engraving.

The invention claimed is:

1. A layered structure comprising
a first layer comprising a thermoplastic plastic, and
a second layer comprising a thermoplastic plastic and a laser-sensitive additive,
wherein the laser sensitive additive comprises a black pigment,
wherein the first layer comprising a thermoplastic plastic is essentially free of laser-sensitive additives,
wherein the second layer comprising a thermoplastic plastic and a laser-sensitive additive has a layer thickness of from 5 to 30 μm, is transparent and is inscribable by laser engraving,
and the black pigment is present in an amount of from 40 to 180 ppm.

2. The layered structure according to claim 1, wherein the black pigment comprises carbon black.

3. The layered structure according to claim 1, wherein the first layer further comprises a white pigment as filler.

4. The layered structure according to claim 3, wherein the white pigment comprises titanium dioxide, zirconium dioxide or barium sulfate.

5. The layered structure according to claim 3, wherein the white pigment comprises titanium dioxide.

6. The layered structure according to claim 1, wherein the thermoplastic plastic in either the first or second layer, independently of one another, is selected from the group consisting of polymers of ethylenically unsaturated monomers, polycondensation products of bifunctional reactive compounds, and mixtures thereof.

7. The layered structure according to claim 1, wherein the thermoplastic plastic in either the first or second layer, independently of one another, is selected from the group consisting of polymers of one or more polycarbonate(s) or copolycarbonate(s) based on diphenols; poly- or copoly-acrylate(s); poly- or copoly-methacrylate(s); polymer(s) or copolymer(s) with styrene, polyurethane(s), and polyolefin(s); poly- or copoly-condensation product(s) of terephthalic acid; poly- or copoly-condensation products of naphthalenedicarboxylic acid; poly- or copoly-condensation product(s) of at least one cycloalkyldicarboxylic acid; polysulfones; and mixtures thereof.

8. The layered structure according to claim 1, wherein the thermoplastic plastic, in either the first or second layer, independently of one another, is selected from the group consisting of polymers of one or more polycarbonate(s) or copolycarbonate(s) based on diphenols, and blends containing at least one polycarbonate or copolycarbonate.

9. The layered structure according to claim 1, wherein the layers are produced by coextrusion.

10. The layered structure according to claim 1, wherein the laser-sensitive additive is present in an amount of from 50 to 160 ppm in the second layer comprising at least one thermoplastic plastic and at least one laser-sensitive additive.

11. A security document comprising the layered structure according to claim 1.

12. An identification document comprising the layered structure according to claim 1.

13. A layered structure comprising
a first layer comprising a thermoplastic plastic, and
a second layer comprising a thermoplastic plastic and a laser-sensitive additive, wherein the laser sensitive additive comprises a black pigment,
wherein the first layer comprising a thermoplastic plastic is essentially free of laser-sensitive additives,
wherein the second layer comprising a thermoplastic plastic and a laser-sensitive additive has a layer thickness of from 5 to 30 µm, and the black pigment is present in an amount of from 40 to 180 ppm, and
wherein the layered structure comprises a further layer comprising a thermoplastic plastic and a laser-sensitive additive, wherein the further layer has a layer thickness of from 5 to 30 µm, wherein the laser-sensitive additive is present in an amount of from 40 to 100 ppm, and wherein the first layer comprising a thermoplastic plastic is arranged between the second layer comprising a thermoplastic plastic and a laser-sensitive additive and the further layer comprising a thermoplastic plastic and a laser-sensitive additive.

14. The layered structure according to claim 13, wherein the layers are produced by coextrusion.

15. A coextruded film comprising
a first layer comprising a thermoplastic plastic and
a second layer comprising a thermoplastic plastic and a laser-sensitive additive,
wherein the second layer comprising a thermoplastic plastic and a laser-sensitive additive has a layer thickness of from 5 to 30 µm, is transparent and is inscribable by laser engraving, and wherein the laser-sensitive additive is present in an amount of from 40 to 180 ppm, wherein the film comprises a further layer comprising a thermoplastic plastic and a laser-sensitive additive, wherein the second and the further layer, independently of one another, have a layer thickness of from 5 to 30 µm and comprise the laser-sensitive additive in an amount of from 40 to 180 ppm, and wherein the first layer comprising a thermoplastic plastic is arranged between the second and the further layer comprising a thermoplastic plastic and a laser-sensitive additive.

16. The coextruded film according to claim 15, wherein the first layer comprising a thermoplastic plastic further comprises a white pigment as filler.

* * * * *